Figures 1, 5:
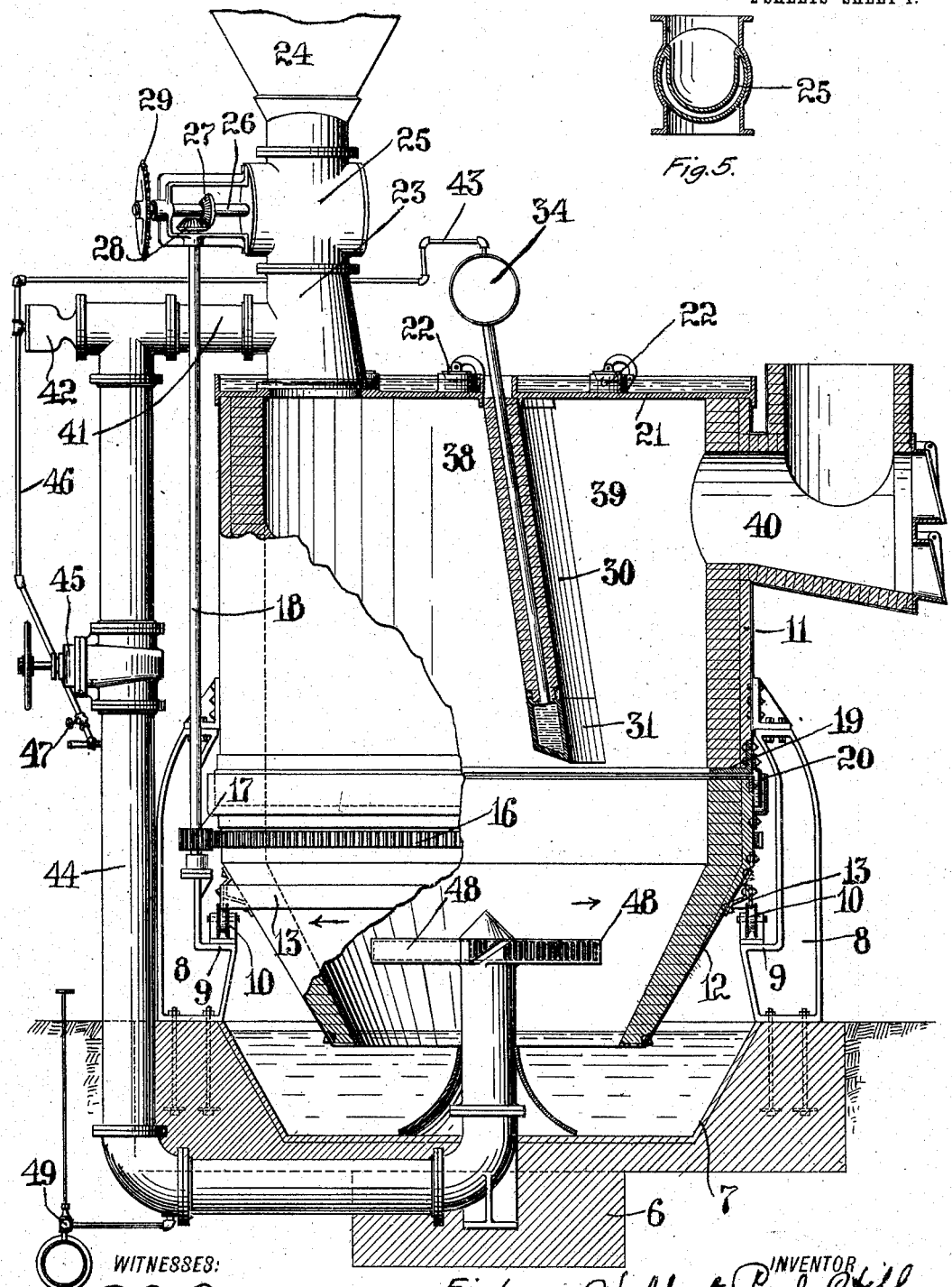

H. P. HILL.
PRODUCER GAS APPARATUS.
APPLICATION FILED APR. 19, 1909.

952,739.

Patented Mar. 22, 1910.
2 SHEETS—SHEET 1.

WITNESSES:

INVENTOR
Halbert Paul Hill
BY
Frank T. Wentworth
ATTORNEY.

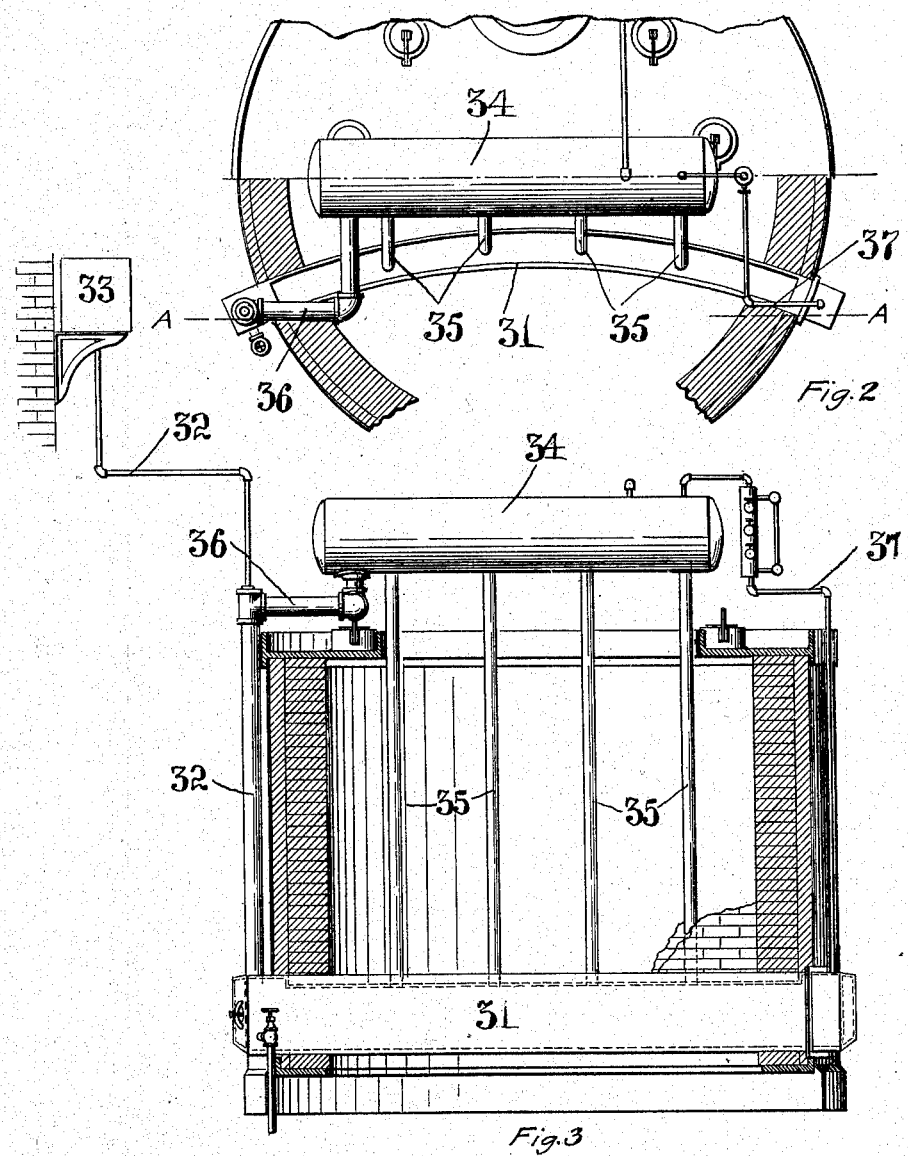
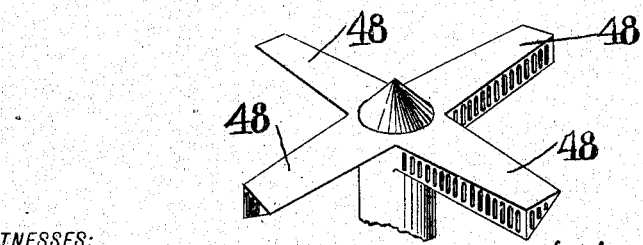

UNITED STATES PATENT OFFICE.

HALBERT PAUL HILL, OF NEW YORK, N. Y.

PRODUCER-GAS APPARATUS.

952,739.  Specification of Letters Patent.  Patented Mar. 22, 1910.

Application filed April 19, 1909. Serial No. 490,709.

*To all whom it may concern:*

Be it known that I, HALBERT PAUL HILL, a citizen of the United States, residing in the borough of Manhattan, in the city, county, and State of New York, have invented certain new and useful Improvements in Producer-Gas Apparatus, of which the following is a specification, reference being had therein to the accompanying drawings, which form a part thereof.

My invention relates to producer gas apparatus and more particularly to a type thereof especially adapted for making producer or water gas from bituminous coal.

The main object of the invention is to provide an apparatus of this character wherein the distillation, and chemical combination of the carbon and oxygen to form the carbon dioxid will occur in one portion of the producer, and the take off will be through a chamber within said producer communicating with said first mentioned chamber through an incandescent body of fuel, thus presenting an incandescent barrier between two communicating portions or chambers of the producer, to cause the consumption of the tar, pitch and free carbon before it can pass to the purifying apparatus, and the engine, or other point of consumption and to convert the carbon dioxid into carbon monoxid.

A further object is to provide a gas producer apparatus of the character above referred to wherein the body of incandescent fuel below the outlet chamber may be changed, as required, to present a fresh body of incandescent fuel at this point and prevent the accumulation of residuum, or the lowering of the temperatures tending to neutralize the efficiency of the apparatus.

A still further object is to provide an apparatus wherein the ash may be discharged without shutting down the apparatus, and thus not only permit the dropping of the fire bed, as desired, but cause the breaking up of any clinkers which may form within the producer, and prevent the bridging of the apparatus and interference with the draft through the incandescent body of fuel.

A still further object is to provide an apparatus wherein the pressures on the opposite sides of the incandescent body of fuel in the distillation chamber, may be substantially equalized to retard to a limited extent, the passage of the charge containing oxygen or both oxygen and hydrogen through the incandescent body of fuel in said chamber to afford sufficient time for the burning of the heavier gases, tar, soot, etc.

A still further object is to provide an apparatus wherein a charge of air and steam, or other gases containing oxygen and hydrogen may be introduced at the intake to the distillation chamber and the same gases, or a hydrocarbon, or steam or some other hydrogen gas may be introduced adjacent to the outlet of said chamber whereby a gas varying in richness as to the volume of hydrogen incorporated therein may be introduced.

A still further object is to provide a producer gas apparatus wherein the distillation chamber will be so constructed and arranged as to provide for the expansion or swelling of the fuel as it becomes coked, thus minimizing the likelihood of the bridging of the said chamber or the formation of obstructive clinkers.

A still further object is to provide an open bottom apparatus, the lower part of which is rotatable relative to the upper part, for the purpose of breaking up the fire bed and discharging the ashes from thereunder, which apparatus will embody therein a twyer having the twofold function of introducing gases in the bottom of the producer and exerting a downward force upon the ash bed and upon any clinkers which may be present therein, so as to automatically accomplish the removal of the ashes and insure the breaking up of said clinkers, thus resulting in the automatic stoking of the apparatus.

A still further object is to provide an apparatus wherein fresh fuel will be automatically introduced to the distillation chamber simultaneously with the discharge of the ashes from the bottom of the producer.

A still further object is to provide a producer gas apparatus having a partition dividing the upper portion thereof into a distillation chamber and a discharge chamber, which partition will project downwardly into the body of incandescent fuel, said partition being water cooled in a manner to preserve the lower edge thereof and at the same time produce the steam required in the operation of the producer.

A still further object is to provide a producer embodying a partition of the character above referred to composed mainly of refractory material as fire bricks, a steam drum or dome and pipes passing through the said refractory material for the purpose of reinforcing same.

A still further object is to provide a producer gas apparatus which may be operated continuously for the production of producer gas or water gas. And a still further object is to provide an apparatus of this character the gas from which may be conducted through pipes without so fouling said pipes as to require frequent burning out of the same.

The invention consists in the novel features of construction and combination of parts hereinafter set forth and described and more particularly pointed out in the claims hereto appended.

Referring to the drawings:—Figure 1 is a side view, partly in section and partly in elevation, of an apparatus embodying my invention; Fig. 2 is a top view of a portion of the upper part thereof, also partly in plan and partly in section, with the feed hopper, its closure and the conduit system discharging air, or steam, or both mixed into the producer, removed. Fig. 3 is a vertical curved section through the dividing partition showing the bottom supporting box and its pipes in elevation and a portion of the refractory part only; Fig. 4 is a detail view of the bottom twyers, and Fig. 5 is a detail view of the hopper closure.

Like numerals refer to like parts throughout the several views.

In the embodiment of my invention shown in the drawings, 6 indicates the foundation for the producer in which is formed a water sealed ash pit 7. Mounted on this foundation at different points about the ash pit are a plurality of brackets 8, having a step therein at 9 adapted to accommodate roller bearings 10.

Mounted on the brackets 8, is a bi-part producer shell consisting of an upper section 11, firmly riveted or otherwise secured to the brackets 8 so as to remain stationary, and a rotary bottom section 12 carrying an annular track 13 coöperating with the roller bearings 10. The upper section 11 is substantially cylindrical throughout, and the walls of the lower portion of the bottom section 12, converge into a reduced discharge mouth below the level of the water in the ash pit, 7. The section 12 is provided with an annular trough 14 extending about the top thereof, projecting into which is an annular flange 15 carried by and extending below the bottom of the section 11, whereby a water seal is formed between the sections of the bi-part shell.

Carried by and extending about the section 12, is a rack 16 by means of which the said section is rotated through the pinion 17 carried on the shaft 18, the bottom section 12 thus being capable of being rotated relative to the upper section 11.

The sections 11 and 12 are lined with fire brick or other refractory material in the customary manner, bottom and top flanges 19, 20 being provided to prevent such a displacement of this lining as would interfere with the free rotation of the bottom section.

The top of the section 11 is closed by an ordinary metallic head 21 having a plurality of covered poke holes 22 therein for use in cases where the automatic stoking does not break up the fire sufficiently. This head also carries a chute 23 discharging into the producer shell and surmounted by a coal hopper 24, whereby coal is introduced to the said shell. The hopper 24 is arranged adjacent to one edge of the producer shell, or eccentrically thereof, and discharged into that portion of the said shell, which, because of the introduction of the fresh fuel thereinto, I term the distillation chamber. To prevent the escape of gases through the hopper 24, I close the chute 23 with a bucket valve 25, having a stem 26 mounted in a suitable frame. This bucket valve is well known in the arts and I make no claim of invention thereof broadly. I do, however, actuate this valve simultaneously with the means for removing ashes from the bottom of the fire, by means of the pinion 27 on the stem 26, and the pinion 28 meshing therewith carried by the shaft 18. The shaft 18 is driven in any desired manner as through the sprocket wheel 29 carried on the stem 26. Dividing the upper part of the section into two chambers, which as a matter of convenience I term the " distillation " and the " outlet " chambers, is a partition 30 extending from the head 21 downwardly to a point where it will be considerably below the upper zone of combustion in the distillation chamber, the sole channel between the said chambers being through the incandescent coke about and below the lower edge of the partition 30. The said partition 30 is so arranged in the section 11 as to make the distillation chamber about double the capacity of the outlet chamber and preferably this partition is inclined downwardly toward the latter chamber in order to make the dimensions adjacent to the bottom thereof greater than adjacent to the top thereof, and thus provide for the expansion or swelling of the fuel as it cokes from the distillation process. As shown in the accompanying drawings, this partition curves toward the outlet chamber, a construction which I have adopted because of its greater strength. The partition as shown in the accompanying drawings, is composed of refractory material as fire bricks, mounted upon the box 31, extending through and resting upon the producer shell. To protect this box from the action of the heat, I water cool it, as shown, and preferably provide means whereby the steam generated in this box may be utilized in the process of making the gas within the producer. Discharging into the box 31 is a pipe 32 communicating with a water tank 33 whereby water is introduced to said box as required. Surmounting the upper section 11 is a steam drum or dome 34, in communication with the box 31, through a plurality of pipes 35 extending through and reinforcing the refractory material of the partition 30, and a pipe 36 discharging into the pipe 32. A suitable water gage system 37 is also provided. The underside of the box 31 is pitched downwardly toward the outlet chamber to prevent the formation of voids adjacent to the bottom of this partition.

For convenience in describing the invention, I have designated the distillation chamber by the numeral 38 and the outlet chamber by the numeral 39.

Leading from the outlet chamber 39 is a duct 40 provided with suitable man-hole openings to facilitate the cleansing thereof and adapted to be placed in communication with the purifying apparatus.

To introduce the requisite volume of air and steam into the distillation chamber above the incandescent body of fuel, I provide a pipe 41 discharging into the chute 23 which pipe has discharging thereinto an induction blower 42 actuated by a steam jet discharged thereinto through the pipe 43 communicating with the upper part of the steam drum 34. This arrangement insures the introduction of air and steam to the distillation chamber with the fresh fuel, and at a point where it will commingle with the heavier gases thus carrying them with it through the incandescent body of fuel wherein they will be in large part burned, and removed from the gas produced.

To introduce air, steam, or a hydrocarbon into that portion of the incandescent body of fuel below the distillation and outlet chambers, I mount a twyer within the converged walls of the lower section 12 of the producer shell, which twyer is in communication through the pipe 44 with the pipe 41 through which air and steam are introduced to the upper part of the distillation chamber. Arranged in this pipe 44, is a valve 45 and extending from the pipe 43 to the pipe 44, between the valve 45 and the twyer, is a steam pipe 46 having a valve 47 in its length. By this means steam may be passed about the valve 45, and steam alone be introduced into the bottom of the producer through the twyer by shutting the valve 45. By this construction, air, steam, or air and steam may be simultaneously discharged above and below the incandescent body of fuel under the same pressure, that being discharged from below intercepting the flow of gas through the incandescent body of fuel below the partition 30, retarding such flow slightly, and supplying the necessary oxygen to combine with any carbon being carried over and to maintain combustion in the zone on the plane of and below the bottom of said partition in a manner to keep the fire at this point in the proper condition. The maintenance of high temperatures at this point also insures the disintegration of the steam and air discharged from the twyer and thus enriches the gas with hydrogen. If desired, an oil pipe may be tapped into the pipe 46 and a hydrocarbon introduced with the steam for the purpose of making an illuminating gas. The pipe 44 extends upwardly through the water sealed ash pit 7, and preferably is fixed or removable in its relation to the lower section 12 of the producer shell. It will thus be observed that as the section 12 of the producer shell is rotated, the body of ash and clinkers is moved about the said twyer, and to prevent the clogging of said twyer, to cause it to grind into the mass of ashes and clinkers, and to force the lessened ashes and clinkers downwardly, I preferably use an especially constructed twyer which will have a considerable range of action. In Fig. 4 I have shown a perspective view in detail of this twyer and by reference to this figure, it will be seen that it consists of a plurality of radially projected triangular hollow arms 48 the rear leg of the triangle and the ends thereof having a plurality of orifices and the other legs of said angle being imperforate, the forward angle thus forming a cone edge with relation to the moving body of ashes. This construction makes a screw of the twyer, the forcing action of which will be downward, or toward the ash pit 7. The arrangement of openings is such as to protect them and prevent their being clogged, as the gases passing through the twyer would blow any ashes or dust which might drop behind the arm, as the said arms cut through the body of ashes.

49 indicates a drain pipe and a connection between same and the pipe 44 for removing condensation from said pipe.

The operation of the herein described apparatus is substantially as follows:—A fire having been properly started in the producer shell, fuel is charged into the distillation chamber 38 until the bed is considerably above the box 31, the incandescent portion thereof extending well above said box. The lower section 12 of the shell, and the bucket valve 25 are slowly rotated by means of the shaft 18, the rack 16 and the pinion 27 on the stem of said valve, thus gradually discharging the ashes through the constricted mouth of the section 12 and simultaneously charging fresh fuel into the chamber 38. The lower edge of the partition 30 projecting as it does into the incandescent body of fuel, and extending below the incandescent body within the chamber 38, the sole means of communication between the chambers 38 and 39 would be across the free edge of this partition, thus causing the gases released in the distillation chamber in passing through the apparatus to the outlet 40 to pass downwardly through the incandescent body of fuel in the chamber 38, into the incandescent body of fuel below the free edge of the said partition, and upwardly through the incandescent body of fuel in the lower section of the producer through the chamber 39. Mixed steam and air are discharged into the upper portion of the distillation chamber 38 where they mix with the heavier gases, tar, soot etc., released through the distillation of the fuel and passed with them downwardly through the incandescent body of fuel in the chamber 38, wherein the greater percentage of this matter is burned and thus removed from the gas being produced. Such matter always rises, and hence the body of incandescent fuel in the form of coke, adjacent to the bottom edge of, and below the partition 30 will be substantially clean, and will serve to both burn this matter and filter the gas, in addition to converting the carbon dioxid into carbon monoxid. It is apparent that the heat adjacent to the box 31 will serve to generate the steam required for charging the apparatus. The constant rotation of the lower section 12 of the producer shell, will serve to break up the fire constantly and maintain substantially constant zones of combustion within the producer, thus lending uniformity in the quality and quantity of gas being produced. This rotation will also serve to bring the same portion of incandescent fuel under the distillation chamber and the outlet chamber successively, thus not only serving to renew the fuel bed under the outlet chamber, but also tending to maintain a constant, uniform condition of the fire throughout the portion of the producer below the partition 30. In addition to this, the automatic removal of the ash and recharging of the apparatus, increases the capacity through the ability to consume within a given time a greater volume of fuel.

When the apparatus is used for making a producer gas exclusively, containing a small percentage of hydrogen, the valve 45 is opened and the charge of air and steam is divided and discharged under the same pressure upon both sides of the incandescent body of fuel. The charge entering through the arms 48 of the twyer will pass upward through the lower portion of the producer shell, through the incandescent body of fuel contained therein, intercepting the charge coming downward through the body of fuel in the chamber 38, thus retarding its flow slightly and subjecting the mixture of carbon dioxid, tar, soot etc., to the action of the fire for a sufficient period to remove a fair percentage of the foreign matter and convert the carbon dioxid to carbon monoxid, the incandescent body of coke adjacent to and below the plane of the box 31, completing the elimination of such matter. Incidentally, the introduction of steam and air in this lowermost zone of combustion will raise the temperatures at this point to a degree where this discharge will be readily disintegrated, the oxygen therein combining with the carbon still uncombined, the mixture being converted to a carbon monoxid as it passes to the outlet chamber 39. This introduction of steam at this point also enriches the mixture with hydrogen. If it be desired to make a water gas, steam only need be introduced through the twyer arms 48.

It will be observed that by the construction heretofore described, I provide a combined up and down draft producer, the down draft producing from the first distillation of the fuel, a carbon dioxid, afterward converted to a carbon monoxid by being passed through an incandescent body of coked fuel, and the up draft introducing gases into this body of coked fuel in a manner to more readily support combustion therein and furnish an excess of oxygen at this point which will combine with any excess of carbon and thus minimize the quantity of carbon passing over in the form of soot or lamp black. It will also be observed that clinkers will be prevented by the intermingling of steam and air with the fuel being charged into the distillation chamber, and the grinding effect due to the rotating section 12, and that the point at which the charge for the down draft is introduced will cause it to commingle with the heavier gases etc., distilled from the fuel previously charged into the distillation chamber, and carry them with it through the incandescent body of fuel where they will be substantially eliminated.

One advantage of this apparatus is that the quantity of carbon carried over in the form of soot will be so reduced as to avoid the fouling of the conduits through which the gases pass, and also the purifying apparatus, thus eliminating a very troublesome feature in the producer gas practice.

A producer of this character requires little attention from the operator and in addition to the elimination of those troubles above referred to, and the increased production from a single unit, may thus be operated with economy.

It is not my intention to limit the invention to the precise details of construction shown in the accompanying drawings, as such may be varied to adapt the invention to different conditions of use, or different types of producers without departing from the spirit and scope of the invention.

I believe it to be broadly new to provide a producer apparatus wherein the combustion chamber is sub-divided by a partition into two distinct chambers communicating with each other, across said partition at a point below the zone of combustion whereby the gases produced are compelled to flow from one chamber to the other through an incandescent body of fuel about said partition thus permitting the maintenance of zones of combustion different in height, in the two chambers, and I intend to claim such broadly.

Having described the invention, what I claim as new, and desire to have protected by Letters Patent, is:—

1. In a producer gas apparatus, a shell, a partition projecting downwardly into said shell whereby a distillation and an outlet chamber communicating with each other about the free edge of said partition are formed, a support for the fire bed below said partition, means whereby fuel may be charged into said distillation chamber, means whereby a gaseous charge may be introduced to said last mentioned chamber, means whereby the gas may be withdrawn through said outlet chamber and means whereby said support for the fire bed may be actuated to shift the incandescent portion of the fire bed below said distillation chamber and said partition to said outlet chamber.

2. In a producer gas apparatus, a shell, a head therefor, a partition projecting downwardly from said head whereby the upper part of said shell is divided into a distillation and an outlet chamber communicating with each other through the lower part of said shell, means whereby fuel may be charged into said distillation chamber, a support for the fire bed below said partition, means whereby a gaseous charge may be introduced to said last mentioned chamber means whereby the gas may be withdrawn through said outlet chamber and means whereby said support for the fire bed may be actuated to shift the incandescent portion of the fire bed below said distillation chamber and said partition to below said outlet chamber.

3. In a producer gas apparatus, a shell, a head therefor, a partition projecting downwardly from said head whereby the upper part of said shell is divided into a distillation and an outlet chamber communicating with each other through the lower part of said shell, means whereby fuel may be charged into said distillation chamber, a support for the fire bed below said partition, means whereby a gaseous charge may be introduced to said last mentioned chamber, a twyer discharging into the lower part of said shell, means whereby the gas may be withdrawn through said outlet chamber and means whereby said support for the fire bed may be actuated to shift the incandescent portion of the fire bed below said distillation chamber and said partition to below said outlet chamber.

4. In a producer gas apparatus, a shell, a head therefor, a partition projecting downwardly from said head whereby the upper part of said shell is divided into a distillation and an outlet chamber communicating with each other through the lower part of said shell, means whereby fuel may be charged into said distillation chamber, a support for the fire bed below said partition, means whereby a gaseous charge may be introduced to said last mentioned chamber, means whereby the gas may be withdrawn through said outlet-chamber and means rotating said support continuously whereby a portion of the incandescent fuel below said distillations will be gradually and continuously shifted beyond said partition to below said outlet chamber.

5. In a producer gas apparatus, a shell, a head therefor, a partition projecting downwardly from said head whereby the upper part of said shell is divided into a distillation and an outlet chamber communicating with each other through the lower part of said shell, means whereby fuel may be charged into said distillation chamber, a support for the fire bed below said partition, a pipe discharging into the upper part of said last mentioned chamber above the fuel bed, whereby the heavy gases, tar, soot etc., are carried with said charge through said fuel bed, a twyer in the lower part of said shell below said chambers, means whereby a gaseous charge is simultaneously discharged through said pipe and said twyer means whereby the gas may be withdrawn through said outlet-chamber and means whereby said support for the fire bed may be actuated to shift the incandescent portions of the fire bed below said distillation chamber and said partition to below said outlet chamber.

6. In a producer gas apparatus, a shell, a head therefor, a partition projecting downwardly from said head whereby the upper part of said shell is divided into a distillation and an outlet chamber communicating with each other through the lower part of said shell, means whereby fuel may be charged into said distillation chamber, a support for the fire bed below said partition, a pipe discharging into the upper part of said last mentioned chamber above the fuel bed, means whereby steam and air mixed are discharged into said pipe, whereby the heavy gases, tar, soot etc., are carried with said mixed air and steam through said fuel bed, a twyer in the lower part of said shell below said chamber, a pipe connection between said first mentioned pipe and said twyer, a valve arranged in said last mentioned pipe between said first mentioned pipe and said twyer, a pipe communicating with said connecting pipe between said valve and said twyer, whereby mixed steam and air may be simultaneously charged into said shell on both sides of the fire, or steam and air may be charged into said shell above said fire and other matter may be charged from below the fire through said twyer, through said last mentioned pipe, a valve in said last mentioned pipe, means whereby the gas may be withdrawn through said outlet chamber and means whereby said support for the fire bed may be actuated to shift the incandescent portion of the fire bed below said distillation chamber and said partition to below said outlet chamber.

7. In a producer gas apparatus, a shell, a head therefor, a partition projecting downwardly from said head whereby the upper part of said shell is divided into a distillation and an outlet chamber communicating with each other through the lower part of said shell, said partition being pitched laterally whereby the lower portion of said distillation chamber will have greater dimensions than the upper portion thereof, means whereby fuel may be charged into said distillation chamber, a support for the fire bed below said partition, means whereby a gaseous charge may be introduced to said last mentioned chamber, means whereby the gas may be withdrawn through said outlet-chamber and means whereby said support for the fire bed may be actuated to shift the incandescent portions of the fire bed below said distillation chamber and said partition to below said outlet chamber.

8. In a producer gas apparatus, a shell, a head therefor, a curved partition projecting downwardly from said head whereby the upper part of said shell is divided into a distillation and an outlet chamber communicating with each other through the lower part of said shell, said partition being pitched laterally whereby the lower portion of said distillation chamber will have greater dimensions than the upper portion thereof, means whereby fuel may be charged into said distillation chamber, a support for the fire bed below said partition, means whereby a gaseous charge may be introduced to said last mentioned chamber, means whereby the gas may be withdrawn through said outlet-chamber and means whereby said support for the fire bed may be actuated to shift the incandescent portions of the fire bed below said distillation chamber and said partition to below said outlet chamber.

9. In a producer gas apparatus, a bi-part shell consisting of two superposed sections, the upper of which is stationary and divided by a downwardly projected partition into a distillation chamber, and an outlet chamber communicating with each other through the lower section and beneath said partition, and is provided with means whereby fuel may be charged into said distillation chamber, and means whereby gas may be withdrawn from said outlet chamber, and the lower of which has an open bottom and is constructed to be rotated, a gas tight seal between said sections, and means for rotating said lower section.

10. In a producer gas apparatus, a bi-part shell consisting of two superposed sections, the upper of which is stationary and divided by a downwardly projected partition into a distillation chamber, and an outlet chamber communicating with each other through the lower section and beneath said partition, and is provided with means whereby fuel may be charged into said distillation chamber, and means whereby gas may be withdrawn from said outlet chamber, and the lower of which has an open bottom and is constructed to be rotated, a gas tight seal between said sections, means rotating said lower section, and a twyer projecting through the open bottom of and into said lower section.

11. In a producer gas apparatus, a bi-part shell consisting of two superposed sections, the upper of which is stationary and divided by a downwardly projected partition into a distillation chamber, and an outlet chamber communicating with each other through the lower section and beneath said partition, and is provided with means whereby fuel may be charged into said distillation chamber, and means whereby gas may be withdrawn from said outlet chamber, and the lower of which has an open bottom and is constructed to be rotated, a gas tight seal between said sections, and a twyer consisting of a plurality of radially projected triangular arms located within said lower section and supported by a pipe passing through the open bottom of said section.

12. In a producer gas apparatus, a bi-part shell consisting of two superposed sections, the upper of which is stationary and divided by a downwardly projected partition into a distillation chamber, and an outlet chamber communicating with each other through the lower section and beneath said partition, and is provided with means whereby fuel may be charged into said distillation chamber, and means whereby gas may be withdrawn from said outlet chamber, and the lower of which has an open bottom and is constructed to be rotated, a gas tight seal between said sections, and a twyer consisting of a plurality of radially projected triangular arms located within said lower section and supported by a pipe passing through the open bottom of said section, said twyer having openings therein at the ends and on the rear leg thereof relative to the direction of rotation of said bottom section.

13. In a producer gas apparatus, the combination with a bi-part shell consisting of a stationary upper section having a downwardly projected partition dividing it into a distillation and an outlet chamber, and a rotary lower section of a fuel chute discharging into the upper portion of said distillation chamber, a bucket valve controlling said chute, means whereby coal is delivered to said chute, and actuating means simultaneously rotating said lower section and actuating said bucket valve whereby coal will be discharged into said producer simultaneously and automatically with the dropping of the fire bed.

14. In a producer gas apparatus, a shell, a box extending across and supported by said shell, a partition of refractory material supported by said box, dividing said shell into a plurality of chambers communicating with each other below said box, a steam dome located exteriorly of said shell, a plurality of pipes connecting said box and said dome, said pipes being embedded in said refractory material, means supplying water to said box, means whereby fuel may be charged into one of said chambers, means whereby a gaseous charge may be introduced to said last mentioned chamber and means whereby the gas may be withdrawn through said other chamber.

In witness whereof, I have hereunto affixed my signature, this 15 day of April, 1909, in the presence of two witnesses.

HALBERT PAUL HILL.

Witnesses:
FRANCIS F. COLEMAN,
JOS. S. REPETTI.